United States Patent [19]

Horng

[11] Patent Number: 5,503,710
[45] Date of Patent: Apr. 2, 1996

[54] DUPLEX LINERBOARD FORMED FROM OLD CORRUGATED CONTAINERS

[75] Inventor: Arbeit J. Horng, Burnaby, Canada

[73] Assignee: MacMillan Bloedel Limited, Vancouver, Canada

[21] Appl. No.: 455,289

[22] Filed: May 31, 1995

[51] Int. Cl.$^6$ .......................... D21F 11/00; D21F 11/12; D21H 11/14

[52] U.S. Cl. ..................... 162/6; 162/130; 162/147; 162/149; 162/189; 162/55

[58] Field of Search .................. 162/6, 55, 83, 162/78, 86, 90, 147, 149, 189, 130, 123, DIG. 9, 190

[56] References Cited

U.S. PATENT DOCUMENTS

| | | | |
|---|---|---|---|
| 3,791,917 | 2/1974 | Bolton, III | 162/55 |
| 4,052,918 | 3/1985 | Mackie et al. | 162/24 |
| 4,753,710 | 6/1988 | Langley et al. | 162/164.3 |
| 4,781,793 | 11/1988 | Halme | 162/55 |
| 4,888,092 | 12/1989 | Prusas et al. | 162/130 |
| 4,999,084 | 3/1991 | Lang et al. | 162/4 |
| 5,061,345 | 10/1991 | Hoffman | 162/125 |
| 5,080,758 | 1/1992 | Horng | 162/130 |
| 5,147,505 | 8/1992 | Altman | 162/129 |

FOREIGN PATENT DOCUMENTS

| | | |
|---|---|---|
| 1177607 | 11/1984 | Canada. |
| 1177608 | 11/1984 | Canada. |

OTHER PUBLICATIONS

Optical refining conditions for development of OCC pulp properties by Ronal J. DeFoe, vol. 76, No. 2 Tappi Journal.
Bleached Pulps for printing & writing papers from old corrugated containers, by X. T. Nguyen, A. Shariff, P. F. Earl and R. J. Eamer, Progress in Paper Recycling, May 1993.

Primary Examiner—David L. Lacey
Assistant Examiner—Jose S. Fortuna
Attorney, Agent, or Firm—C. A. Rowley

[57] ABSTRACT

An improved duplex linerboard is formed from old corrugated containers (OCC) by first repulping the OCC and screening it to provide a fine fraction and a coarse fraction. $NaHSO_3$ or $H_2O_2$ is applied to the fine fraction and the fine fraction produce a chemically treated fine fraction which is then refined. Coarse fraction is separately refined and the refined coarse fraction pulp is then used to form the bottom ply of a multi-ply board and the refined fine fraction pulp used to form the top ply of the multiply board.

9 Claims, 2 Drawing Sheets

DUPLEX LINERBOARD FORMED FROM OLD CORRUGATED CONTAINERS

FIELD OF INVENTION

The present invention relates to the manufacture of multi-ply boards from old corrugated containers, more particularly, the present invention relates to the manufacture of a multi-ply board using a coarse fraction for a bottom ply and a fine fraction for a top ply.

BACKGROUND OF THE INVENTION

The concept of separating pulps in two different fractions and treating the two fractions differently is not uncommon. For example, such separation of mechanical pulps into a long fiber fraction and short fiber fraction and treating the two pulps differently or treating only the long fiber fraction is taught for example, in Canadian patents 1,177,607 and 1,177,608 issued to Mackie et al. on Nov. 13, 1984. These processes have not attained significant commercial success.

Recovery of fiber from used corrugated boxes generally known as old corrugated containers (OCC), and its reuse to produce duplex linerboard is well known. In these processes, generally the OCC is first repulped and then separated into a base sheet fraction and a top sheet fraction which are then separately refined to develop the characteristics desired for the particular application to which the pulp is to be applied. If the pulp is to be used as a top or exposed sheet, it will be subjected to significantly more beating or refining than the coarse or base sheet.

Sometimes, the separation of the pulp into two fractions is done in a fractionator to produce long fiber fraction and short fiber fraction which are again refined separately to produce the required characteristics for the particular pulp, i.e. the short fiber fraction requires less work than the long fiber fraction although the short fiber fraction is not normally used for the top sheet. The objective is to have a base sheet with a freeness of somewhere between 500 and 600 and top sheet with a freeness of somewhere between 250 and 400. The resultant sheets generally have about the same physical characteristics. However, the fines fraction seems to be a little brighter and thus, improves the brightness slightly of the exposed surface.

BRIEF DESCRIPTION OF THE PRESENT INVENTION

It is an object of the present invention to provide an improved duplex linerboard having improved strength and brightness characteristics relative to that of conventionally made duplex linerboard.

Broadly, the present invention relates to a method of producing a duplex linerboard from waste corrugated containers (OCC) comprising dispersing the OCC in water to produce a pulp slurry, screening said slurry to provide a fine fraction and a coarse fraction, said fine fraction comprising between 20 or 60% of said pulp, applying a treating agent selected from the group consisting of sodium bisulfite ($NaHSO_3$) and hydrogen peroxide ($H_2O_2$) to said fine fraction in the amounts of between 0.5 and 5% or 0.25 and 3% respectively based on the oven dried weight of said fine fraction to produce a treated fine pulp fraction, refining said treated fine pulp fraction to a freeness in the range of 250 to 400 ml (Canadian Standard Freeness (CSF)) to provide a refined fine fraction pulp, separately refining said coarse fraction to a CSF of between 500 and 600 ml to form a refined coarse fraction pulp and forming a first ply from said refined coarse fraction pulp and a second ply from said refined fine fraction pulp to produce a duplex linerboard.

Preferably said treating agent will consist essentially of $NaHSO_3$

Preferably said $NaHSO_3$ will be applied in the amount of between 0.5 and 3%.

Preferably, said coarse fraction will be treated with caustic in the amount of between 0.5 and 5% (measured as NaOH) based on the oven dried weight of the pulp in said coarse fraction prior to said separate refining of said coarse fraction.

Preferably said coarse fraction will be treated with caustic in the a mount of between 1 and 3%.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
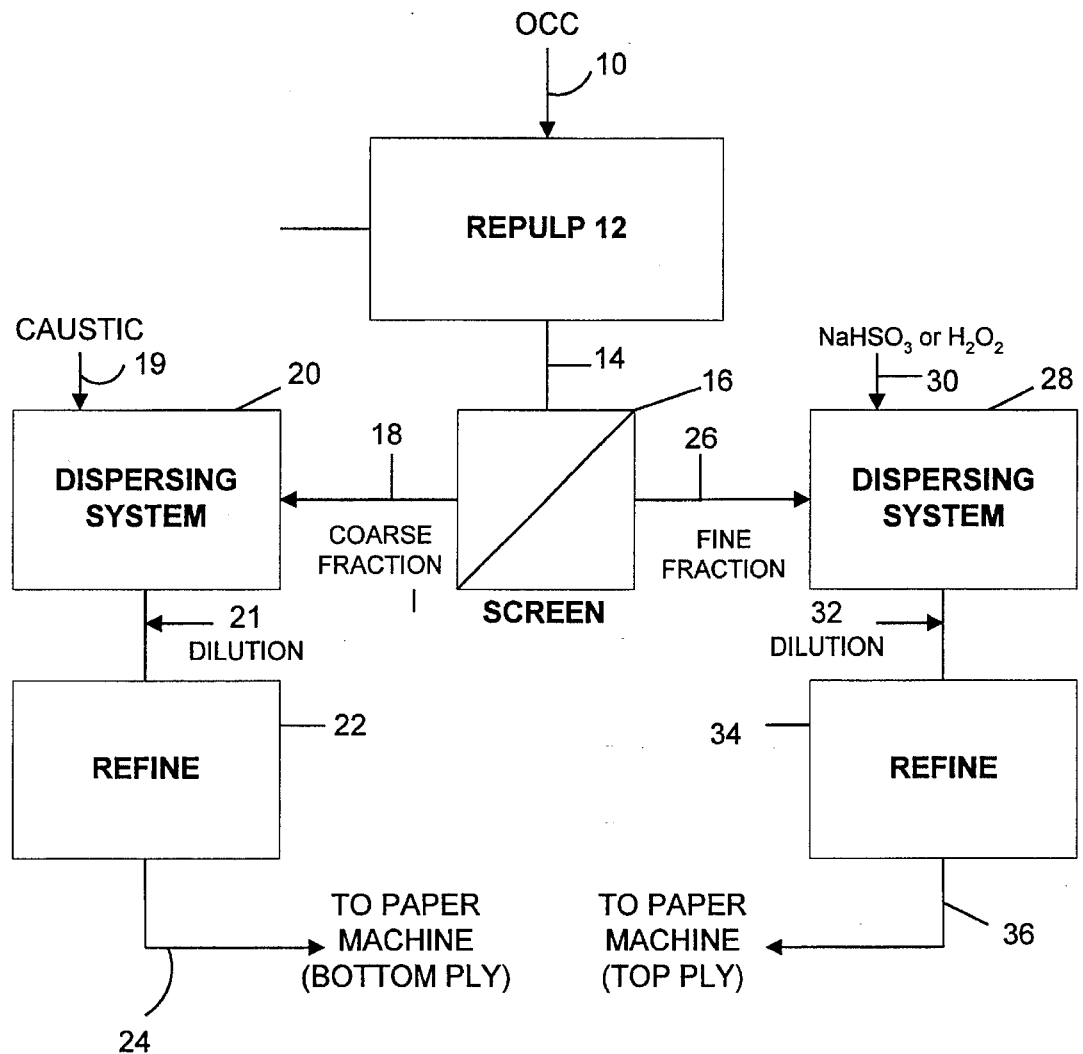
FIG. 1 is a schematic illustration (flow diagram) of the process of the present invention.

As shown in FIG. 1, old corrugated containers (OCC) are introduced as indicated at 10 and repulped as indicated at 12. Repulped OCC is then fed as indicated by the arrow 14 to a screen 16 where it is separated into a coarse fraction which is carried as indicated by line 18 to a dispersing system 20 wherein preferably chemical i.e. caustic most preferably sodium hydroxide (NaOH) is applied as indicated at 19. Dilution water is added as indicated 21 to bring the pulp from a consistency generally of about 20 to 30% to the desired consistency which will normally be in the range of 3 to 5% for subsequent refining. This coarse fraction is then refined as indicated at 22 to produce a refined coarse fraction pulp, preferably having a Canadian Standard Freeness of 500 to 600 ml., is sent to the paper machine as indicated by the arrow 24 and used normally to form the bottom ply of the multi-ply duplex linerboard.

The fine fraction as indicated by the arrow 26 is directed to a dispersing system 28, a suitable brightness and strength enhancement chemical is added as indicated at 30 to chemically treat the short or fine fiber fraction. The chemically treated fine fraction is diluted by the addition of dilution water as indicated at 32 from a consistency of about 20 to 30% to the desired consistency for refining which will normally be in the range of 3 to 5% and then passed to a refiner 34. The fine fraction pulp from the refiner 34 which preferably is refined to a Canadian Standard Freeness (CSF) of between 250 and 400 ml is directed to a papermachine as indicated at 36 and normally used to form a top ply of a duplex board.

Normally, a duplex linerboard will be composed of 20 to 30% top sheet and 70 to 80% base sheet.

Figure 2:
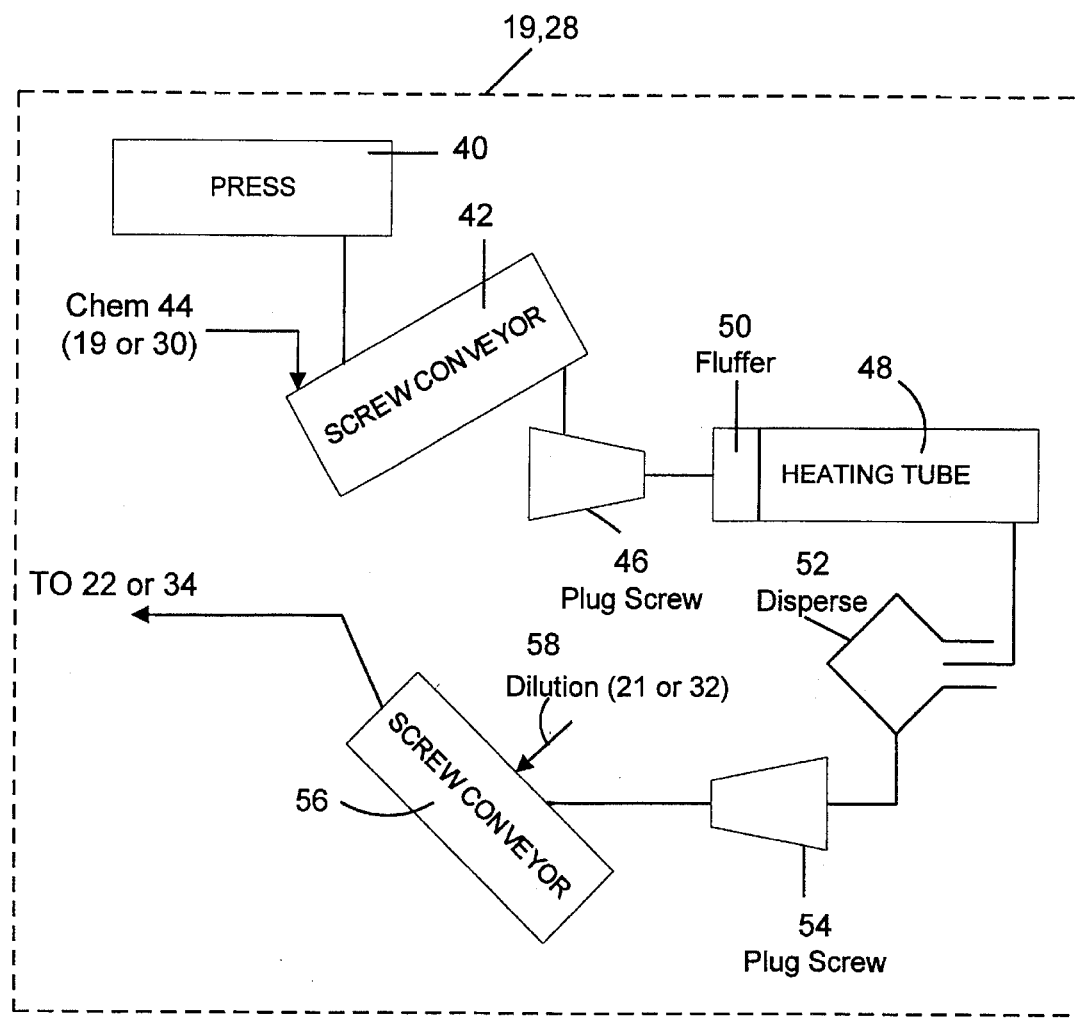
FIG. 2 is a schematic flow diagram of a typical dispersing system as contemplated for use in the present invention

A typical dispersing system 20 or 28 as shown in FIG. 2 will include a press 40 from which the pulp passes to a screw conveyor 42. The chemical to be added is preferably added as indicated at 44 to the screw conveyor 42, i.e. the chemical additions indicated at 19 for the coarse fraction and 30 for the fine fraction would be applied at 44 in their respective dispersing systems 20 and 28.

The pulp passes from the conveyer 42 to a plug screw 46 where a sealing plug is formed to seal the heating tube 48 into which the pulp is delivered. The heating tube 48 preferably applies heat (steam) to raise the temperature of the pulp to about 220° to 260° F. In many cases a fluffer 50 will fluff the pulp before it is introduced into the heating tube 48. The so heated and treated pulp is then fed to a disperser 52 which normally is in the form of a refiner that has plates selected to and that are set (spaced) to break-up and mix the pulp without significantly changing the pulp freeness. The pulp then passes through a second plug screw 54 sealing the opposite side of the heating tube 48 and disperser 52 to the first plug screw 46 and then into a second screw conveyor 56 wherein the pulp is diluted e.g. by the addition of dilution water as indicated at 58 i.e. the dilution water 21 and 32 for the coarse and fine fractions would be introduce as indicated at 58 in their respective dispersing systems 20 and 28. The pulp leaving the dispersing system will preferably be at a consistency of between 3 to 5% for feeding into the refiner 22 or 34.

Generally, the chemical additive applied to the fine fraction will be sodium bisulfite ($NaHSO_3$) or peroxide (normally hydrogen peroxide ($H_2O_2$)) and will be added in sufficient quantity to partially brighten and/or soften the pulp and to facilitate subsequent treatment for development of improved properties.

Preferably, $NaHSO_3$ will be the chemical additive applied to the fine fraction. $NaHSO_3$ will be applied in an amount of between 0.5 and 5%, more preferably between 1 and 3% based on the oven dried weight of the pulp forming the fine fraction and will be uniformly mixed with the fine fraction in the dispersing system 28.

When $H_2O_2$ is used as the chemical additive to the fine fraction it is normally applied in the amount of between 0.25 and 3% preferably between 0.5 and 2% based on the oven dried weight of the pulp forming the fine fraction.

The chemically treated fine fraction leaving the dispersing system 34 is subjected to refining in the refiner 34 to a freeness between 250 to 400 ml. to provide a refined fine fraction pulp which as above indicate preferably is fed to the paper machine as indicated at 36 to form the top ply of the duplex board.

Some cases, it may be desirable to chemically treat the coarse fraction by first apply and mix caustic for example, sodium hydroxide (NaOH), into the long or coarse fiber fraction as indicated by the arrow 38. The amount of caustic applied will normally be between about 0.5 to 5% more preferably between 1 and 2% (measure as NaOH) and based on the oven dried weight of the long fiber fraction.

The caustic treated pulp leaves to dispersing system 20 and is fed to the refiner 22 where as above indicated it is preferably refined to a freeness of between 500 and 600 ml and then to the paper machine as indicated at 24 as described above.

It has been found that by chemically treating the fine fiber fraction with $NaHSO_3$ or $H_2O_2$ and separately refining the coarse and fine fractions, the resulting duplex linerboard is at least equal to and in the most cases is stronger than the conventionally made duplex board. By using the chemically treated fine fiber fraction as the exposed or top ply, the brightness of the resultant duplex board on the exposed side is significantly higher, generally about 2 to 5 points higher than that obtained using the conventional process.

It has been found that the use of $NaHSO_3$ as the chemical treatment agent for the fine fiber fraction produces a significantly better improvement than the use of hydrogen peroxide for this purpose although the use of hydrogen peroxide does show a significant improvement over the conventional process, i.e. with the chemical treatment of the fine fraction, both the brightness and the strength of the two ply product are improved. It has also been found that the drainage rate is not adversely affected, and is increased in the case of $NaHSO_3$ treatment.

EXAMPLE

A pulp was made from OCC by a repulping operation and then divided into five different samples, these different samples were then treated in the manners described below in Table I and the resultant characteristics of the pulp is also presented in Table I.

In the case where the pulp was divided through a long fiber (coarse fiber fraction) and a short fiber fraction (fine fiber fraction), the fine fiber fraction constituted 60% of the pulp. Comparison of the results show clearly that the use of 2% $NaHSO_3$ on the short fiber fraction to form one of the plies and if no chemical treatment to the long fiber fraction, the resultant product had a relatively short drainage time, i.e. drain almost 10 seconds faster than the next quickest draining system. This change in drainage time

TABLE I

OCC Fractionation and Chemical Treatment
Two-Ply Linerboard Handsheet Testing Results

|  |  | 1 | 2 | 3 | 4 | 5 |
| --- | --- | --- | --- | --- | --- | --- |
| Base Sheet |  | Whole OCC | Untreated Long Fibre | Untreated Long Fibre | Untreated Long Fibre | 1% NaOH Long Fibre |
| Top Sheet |  | Whole OCC | Untreated Short Fibre | 2% $NaHSO_3$ Short Fibre | 1% $H_2O_2$ Short Fibre | 1% $H_2O_2$ Short Fibre |
| Base Sheet PFI Revolutions |  | 500 | 2700 | 2700 | 2700 | 2250 |
| Base Sheet CSF | (ml) | 515 | 537 | 537 | 537 | 546 |
| Top Sheet PFI Revolutions |  | 3500 | 250 | 250 | 250 | 250 |
| Top Sheet CSF | (ml) | 339 | 325 | 378 | 253 | 253 |
| Drainage Time | (s) | N/A | 27.2 | 17.7 | 29.7 | 25.1 |
| Elementary Prop. |  |  |  |  |  |  |
| Basis Weight | (g/m²) | 207.4 | 202.9 | 204.1 | 205.9 | 204.0 |
| Caliper | (microns) | 373 | 356 | 359 | 348 | 347 |
| Density | (g/cm³) | 0.555 | 0.571 | 0.569 | 0.591 | 0.588 |

TABLE I-continued

| | | OCC Fractionation and Chemical Treatment Two-Ply Linerboard Handsheet Testing Results | | | | |
|---|---|---|---|---|---|---|
| | | 1 | 2 | 3 | 4 | 5 |
| Physical Strength | | | | | | |
| Tear Index | (mN.m$^2$/g) | 20.8 | 20.0 | 22.1 | 19.9 | 20.2 |
| Tensile Break Length | (m) | 5304 | 5133 | 5938 | 5395 | 5778 |
| Stretch | (%) | 3.1 | 2.9 | 3.6 | 3.0 | 3.2 |
| T.E.A. Index | (mJ/g) | 1125 | 1019 | 1471 | 1095 | 1299 |
| Burst Index | (kPa · m$^2$/g) | 3.74 | 3.69 | 4.21 | 3.93 | 4.13 |
| Mod. of Elasticity | (psi*10$^3$) | 333 | 423 | 346 | 397 | 355 |
| Ring Crush | (lb/6 in) | 110.2 | 105.8 | 109.6 | 115.4 | 112.6 |
| STFI Compression | (lb/in) | 29.2 | 31.2 | 32.1 | 33.4 | 32.4 |
| Internal Bond | (lb/4 in$^2$) | 106 | 103 | 101 | 107 | 110 |
| Gurley Stiffness | (lb/1*3 in) | 4225 | 3520 | 3740 | 3680 | 3925 |
| Other | | | | | | |
| Sheffield Porosity | (ml/min) | 41 | 50 | 54 | 43 | 35 |
| Gurley Porosity | (s/100 ml) | 90 | 68 | 58 | 84 | 103 |
| Sheffield Smoothness | (ml/min) | 236 | 261 | 231 | 231 | 223 |
| Parker Print Surf | (microns) | 6.3 | 6.5 | 6.2 | 6.3 | 6.2 |
| Brightness | | | | | | |
| Top Sheet | (% ISO) | 17.4 | 18.7 | 21.0 | 24.1 | 23.7 |
| Base Sheet | (% ISO) | 17.8 | 17.1 | 17.2 | 16.8 | 17.6 |

Notes:
Long fibre refined in PFI mill to target CSF of 500–550 ml
Short fibre refined in PFI mill for 250 revolutions to ensure differences seen are the result of chemical treatment not mechanical treatment
Except whole OCC which was refined to target 300–350 ml CSF is not attributable to the higher freeness of the top sheet. Rather, it is the result of the chemical treatment.

It will also be noted that though the density and basis weight of the resultant two ply sheet were about the same, the strength characteristics of the two ply board made using the short fiber treated with 2% NaHSO$_3$ showed significant improvement in substantially all of the physical strength properties of the paper relative to that obtained using the conventional processes as shown in column under Whole OCC and Untreated Long Fiber and Untreated Short Fiber, i.e. columns 1 and 2.

The two ply linerboard of column 4 also showed at least the equivalent strength characteristics and slightly better for some strength characteristics than obtained using conventional process but certainly not as good as that obtained with the pulp shown in column 3, which is the preferred embodiment of the present invention.

Column 5, wherein the long fiber fraction was treated to 1% sodium hydroxide and the short fiber fraction 1% hydrogen peroxide, the resultant linerboard did show some improvement in its physical characteristics over that of the conventional two ply linerboard described in columns 1 and 2. However, even this linerboard was not as strong as the duplex linerboard shown in column 3, and produced using the preferred form of the present invention.

It will be noted that each of the short fiber fractions were treated essentially the same in the PFI mill namely to 250 revolutions so that the differences seen are the result of chemical treatment not mechanical treatment.

Having described the invention, modifications will be evident to those skilled in the art without departing from the scope of the invention as defined in the appended claims.

I claim:

1. A method of producing a duplex linerboard from old corrugated containers (OCC) comprising dispersing the old corrugating containers in water to produce a pulp slurry, screening said slurry to provide a fine fraction and a coarse fraction, said fine fraction comprising between 20 and 60% of said pulp, applying a treating agent selected form the group consisting of sodium bisulfite (NaHSO$_3$) and hydrogen peroxide (H$_2$O$_2$) to said fine fraction, said sodium bisulfite added in amount of between 0.5 and 5% and said hydrogen peroxide added in amount between 0.25 and 3% based on the dried weight of said fine fraction to produce a treated fine fraction, refining said treated fine fraction to a freeness in the range of 250 to 400 ml (Canadian Standard Freeness) (CSF) to produce a refined fine fraction pulp, separately refining said coarse fraction to a CSF of between 500 and 600 ml to produce refined coarse fraction pulp and forming a first ply from said refined coarse fraction pulp and a second ply from said refined fine fraction pulp and forming a duplex linerboard from said first ply and said second ply.

2. A method as defined in claim 1 wherein said treating agent is NaHSO$_3$.

3. A method as defined in claim 2 wherein said NaHSO$_3$ is applied in the amount of between 1 and 3% based on the dried weight of said fine fraction.

4. A method as defined in claim 1 wherein said coarse fraction is treated with caustic in the amount of between 0.5 and 5% (measured as NaOH) based on the dried weight of the pulp in said coarse fraction.

5. A method as defined in claim 2 wherein said coarse fraction is treated with caustic in the amount of between 0.5 and 5% (measured as NaOH) based on the dried weight of the pulp in said coarse fraction.

6. A method as defined in claim 3 wherein said coarse fraction is treated with caustic in the amount of between 0.5 and 5% (measured as NaOH) based on the dried weight of the pulp in said coarse fraction.

7. A method as defined in claim 1 wherein said coarse fraction is treated with caustic in the amount of between 1 and 3% (measured as NaOH) based on the dried weight of the pulp in said coarse fraction.

8. A method as defined in claim 2 wherein said coarse fraction is treated with caustic in the amount of between 1 and 3% (measured as NaOH) based on the dried weight of the pulp in said coarse fraction.

9. A method as defined in claim 3 wherein said coarse fraction is treated with caustic in the amount of between 1 and 3% (measured as NaOH) based on the dried weight of the pulp in said coarse fraction.

* * * * *